(12) United States Patent
Park

(10) Patent No.: US 8,634,042 B2
(45) Date of Patent: Jan. 21, 2014

(54) LIQUID CRYSTAL DISPLAY WITH A PLURALITY OF LIQUID CRYSTAL DISPLAY MODULES

(75) Inventor: Woon-yong Park, Gyeonggi-do (KR)

(73) Assignee: Tovis Co., Ltd., Incheon (KR)

( * ) Notice: Subject to any disclaimer, the term of this patent is extended or adjusted under 35 U.S.C. 154(b) by 170 days.

(21) Appl. No.: 13/128,407

(22) PCT Filed: Nov. 4, 2009

(86) PCT No.: PCT/KR2009/006457
§ 371 (c)(1),
(2), (4) Date: May 9, 2011

(87) PCT Pub. No.: WO2010/053292
PCT Pub. Date: May 14, 2010

(65) Prior Publication Data
US 2011/0221995 A1    Sep. 15, 2011

(30) Foreign Application Priority Data
Nov. 10, 2008    (KR) .................. 10-2008-0110919

(51) Int. Cl.
*G02F 1/1333* (2006.01)
*G02F 1/133* (2006.01)
*G02F 1/1347* (2006.01)
*F21V 7/04* (2006.01)

(52) U.S. Cl.
USPC .................. 349/73; 349/58; 349/60; 349/74; 362/632; 362/633; 362/634

(58) Field of Classification Search
USPC .................. 349/58, 60, 73–74; 362/632–634
See application file for complete search history.

(56) References Cited

U.S. PATENT DOCUMENTS

| 5,828,410 A * | 10/1998 | Drapeau ....................... 348/383 |
| 2002/0003592 A1 * | 1/2002 | Hett et al. ....................... 349/58 |
| 2002/0140342 A1 | 10/2002 | Sundahl |
| 2008/0055520 A1 * | 3/2008 | Chuang et al. .................. 349/73 |
| 2008/0158468 A1 * | 7/2008 | Kim et al. ....................... 349/58 |

FOREIGN PATENT DOCUMENTS

| JP | 2004-039476 A | 2/2004 |
| JP | 2005-347005 A1 | 12/2005 |
| JP | 2007-141568 | 6/2007 |
| JP | 2007-287338 | 11/2007 |
| WO | WO 0242838 A1 | 5/2002 |

* cited by examiner

*Primary Examiner* — Lauren Nguyen
(74) *Attorney, Agent, or Firm* — Rabin & Berdo, P.C.

(57) ABSTRACT

The present invention relates to a liquid crystal display. A liquid crystal display includes: a mounting plate; a backlight unit; a plurality of liquid crystal panels which are arranged to be adjacent in a state of being spaced from an upper surface of the mounting plate; a fixing frame which is connected to the mounting frame and includes portions extending along neighboring edges of the plurality of the liquid crystal panels in a state of being spaced from one another by a predetermined distance; and a fixing bar which is fitted between the adjacent portions of the fixing frame in a state of pressing edges of the neighboring liquid crystal panels among the plurality of the liquid crystal panels. Since a liquid crystal panel is fixed by a fixing bar, the liquid crystal panel can be fixed more firmly with a simple structure.

9 Claims, 3 Drawing Sheets

LIQUID CRYSTAL DISPLAY WITH A PLURALITY OF LIQUID CRYSTAL DISPLAY MODULES

FIELD OF THE INVENTION

The present invention relates to a liquid crystal display, and more particularly to, a liquid crystal display with a plurality of liquid crystal display modules.

BACKGROUND ART

Generally, a liquid crystal display has various advantages such as light weight, small thickness, low power consumption, etc., so it is widely used for display devices and research for the same has be continuously made.

Recently, demands for a liquid crystal display having large display screen is increased. In order to realize a liquid crystal display having a large display screen, there is a method to enlarge a liquid crystal panel, but there is a limit in enlarging a liquid crystal panel and the manufacturing cost rapidly increase in response to enlargement of a liquid crystal panel.

Meanwhile, in order to realize a liquid crystal display while solving the above-stated problem, a liquid display device having a plurality of liquid crystal display modules has been introduced. That is, a method of forming a liquid crystal display having a large display screen by arranging adjacently a plurality of liquid crystal display modules. Such a liquid crystal display may be also called as a tiled liquid crystal display.

In a liquid crystal display device which is formed by arranging a plurality of liquid crystal display modules, a portion where neighboring black bezels are adjacently disposed becomes smaller as the width of a black bezel is smaller, and this is advantageous. However, it is general that a plurality of liquid crystal panels are fixed to one mounting plate and liquid crystal panels are fixed by attaching a support member to the mounting plate using double-sided adhesive tape at the black bezel, and at this time, if the width of a black bezel is small, it is difficult that the support member and the liquid crystal panel are attached with sufficient strength.

DETAILED DESCRIPTION OF THE INVENTION

Technical Problem

The present invention has been made in an effort to provide a liquid crystal display having a plurality of liquid crystal display modules in which liquid crystal panels can be fixed more firmly without decreasing image display areas.

Technical Solution

An exemplary embodiment of the present invention provides a liquid crystal display including: a mounting plate; a backlight unit which is mounted to the mounting plate; a plurality of liquid crystal panels which are arranged to be adjacent in a state of being spaced from an upper surface of the mounting plate; a fixing frame which is connected to the mounting frame and includes portions extending along neighboring edges of the plurality of the liquid crystal panels in a state of being spaced from one another by a predetermined distance; and a fixing bar which is fitted between the adjacent portions of the fixing frame in a state of pressing edges of the neighboring liquid crystal panels among the plurality of the liquid crystal panels.

The liquid crystal display may further include an optical sheet disposed under the liquid crystal panel, and a groove to which the optical sheet is inserted may be formed on an inside surface of the fixing frame.

The liquid crystal display may further include a tempered glass which covers upper surfaces of the plurality of the liquid crystal panels in a state of pressing an upper surface of the fixing bar.

The fixing bar may include: a pillar which is fitted between the adjacent portions of the fixing frame; and a head which is extended along a lateral direction at an upper end of the pillar to press the edges of the neighboring liquid crystal panels.

Another exemplary embodiment of the present invention provides a liquid crystal display including: a mounting plate; a plurality of liquid crystal display module respectively including a liquid crystal panels which is arranged to be adjacent in a state of being spaced from an upper surface of the mounting plate; a fixing frame which is connected to the mounting frame and includes portions extending along neighboring edges of the plurality of the liquid crystal panels in a state of being spaced from one another by a predetermined distance; and a fixing bar which is fitted between the adjacent portions of the fixing frame in a state of pressing edges of the neighboring liquid crystal panels among the plurality of the liquid crystal panels.

The respective liquid crystal display module may include: an optical sheet disposed under the liquid crystal panels; and a backlight unit which is disposed below the optical sheet. A groove to which the optical sheet is inserted may be formed on an inside surface of the fixing frame.

The backlight unit may be disposed onto an upper surface of the mounting plate.

The liquid crystal display may further include a tempered glass which covers upper surfaces of the plurality of the liquid crystal display modules in a state of pressing an upper surface of the fixing bar.

The fixing bar may include: a pillar which is fitted between the adjacent portions of the fixing frame; and a head which is extended along a lateral direction at an upper end of the pillar to press the edges of the neighboring liquid crystal panels.

Advantageous Effects

According to the present invention, a liquid crystal panel is fixed by a fixing bar, so the liquid crystal panel can be fixed more firmly with a simple structure.

BRIEF DESCRIPTIONS OF DRAWINGS

BEST MODE

The present invention will now be described more fully hereinafter with reference to the accompanying drawings.

Figure 1:
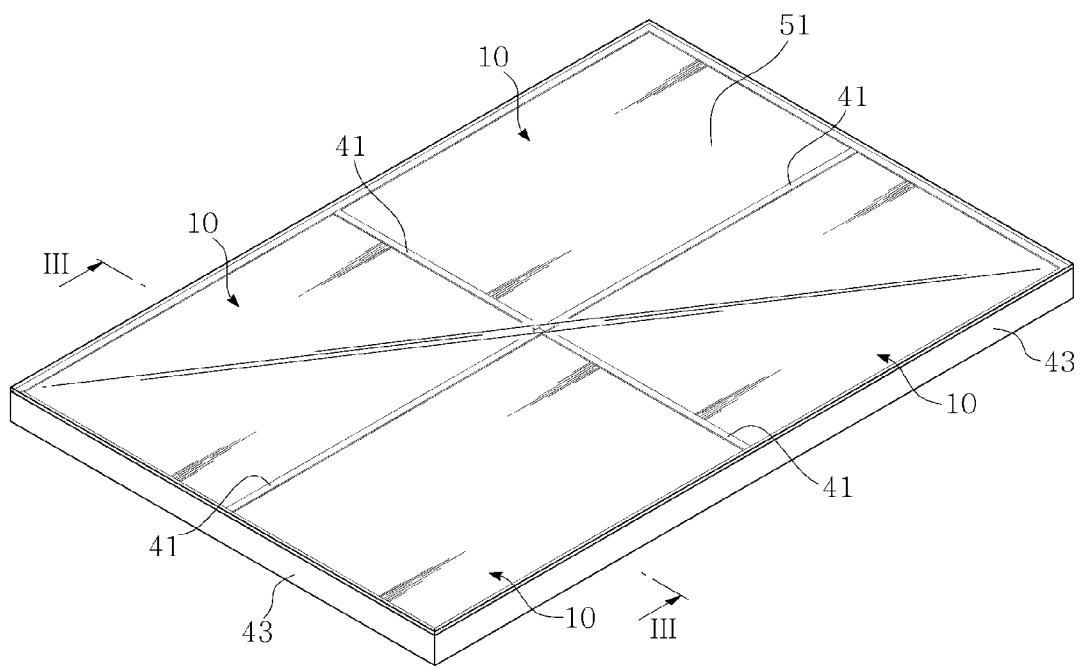
FIG. 1 is a perspective view of a liquid crystal display according to an embodiment of the present invention.

In the drawings, the thickness of layers, films, panels, regions, etc. are exaggerated for clarity. Like reference numerals designate like elements throughout the specification. It will be understood that when an element such as a layer, film, region or substrate is referred to as being "on" another element, it can be directly on the other element or intervening elements may also be present. In contrast, when an element is referred to as being "directly on" another element, there are no intervening elements present.

Referring to FIG. 1, a liquid crystal display according to an embodiment of the present invention includes a plurality of liquid crystal display modules 10.

Figure 2:
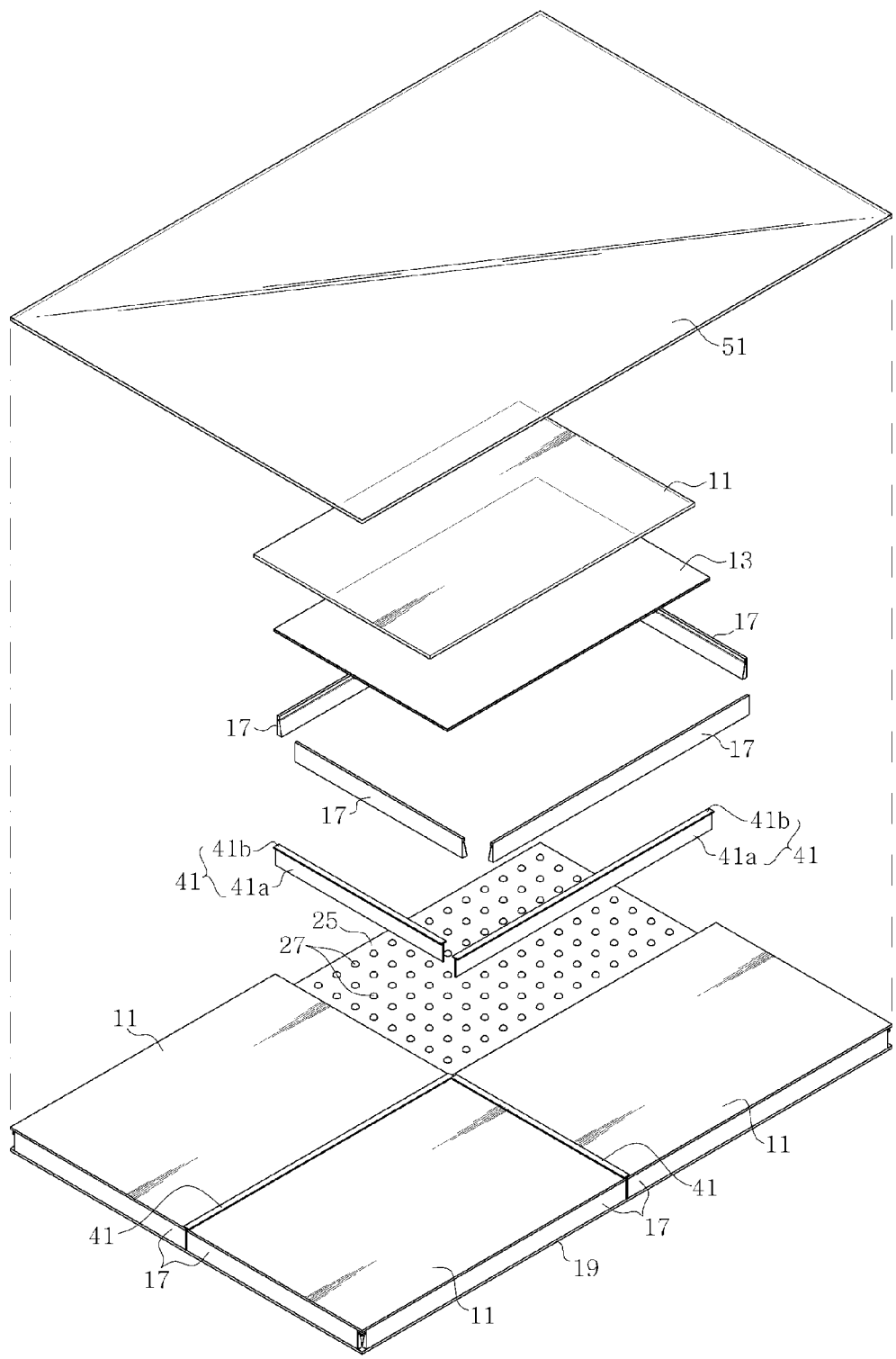
FIG. 2 is a partial exploded view of a liquid crystal display according to an embodiment of the present invention.
Figure 3:
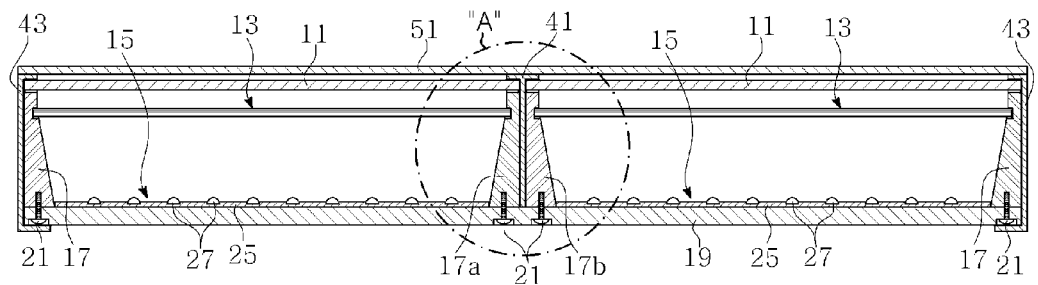
FIG. 3 is a cross sectional view taken along a ling III-III in FIG. 1.

The liquid crystal display module 10 may be a conventional liquid crystal display which forms desired images by applying an electric field to a liquid crystal layer. For example, as shown in FIG. 2 and FIG. 3, the respective liquid crystal display module 10 may include a liquid crystal panel 11, an optical sheet 13, and a backlight unit 15. And the liquid crystal display module 10 may further include a driving circuit for controlling operations of the liquid crystal panel 11 and the backlight unit 15, or the like.

Although four liquid crystal display modules 10 are illustrated in the drawing, the number of the liquid crystal module 10 is not limited thereto and may be varied. In addition, although among four liquid crystal display modules 10, two are arranged in a horizontal direction and the other two are arranged in a vertical direction in the drawing, the arrangement of the liquid quid display modules 10 can be varied.

The liquid crystal display module 10 is fixed to a mounting plate 19 by a fixing frame 17. That is, referring to FIG. 1 to FIG. 3, the fixing frame 17 is fixed to the mounting plate 19, and the plurality of the liquid crystal panels 11 are fixed to the fixing frame 17.

The fixing frame 17 may be attached to the mounting plate 19 to divide the upper surface of the mounting plate 19 into a plurality of areas. At this time, the liquid crystal panels 11 are respectively disposed in the divided areas and display images, and in this context, these areas are referred to as visible areas hereinafter. For example, as shown in the drawings, the fixing frame 17 may be fixed to the upper surface of the mounting plate 19 to divide the upper surface of the mounting plate 19 into four visible areas.

At this time, as shown in FIG. 3, the fixing frame 17 may be fixed to the mounting plate 19 by bolts 21. The fixing frame 17 may be formed material such as metal, plastic material or the like which can provide the strength needed for supporting the liquid crystal panel 11.

Figure 4:
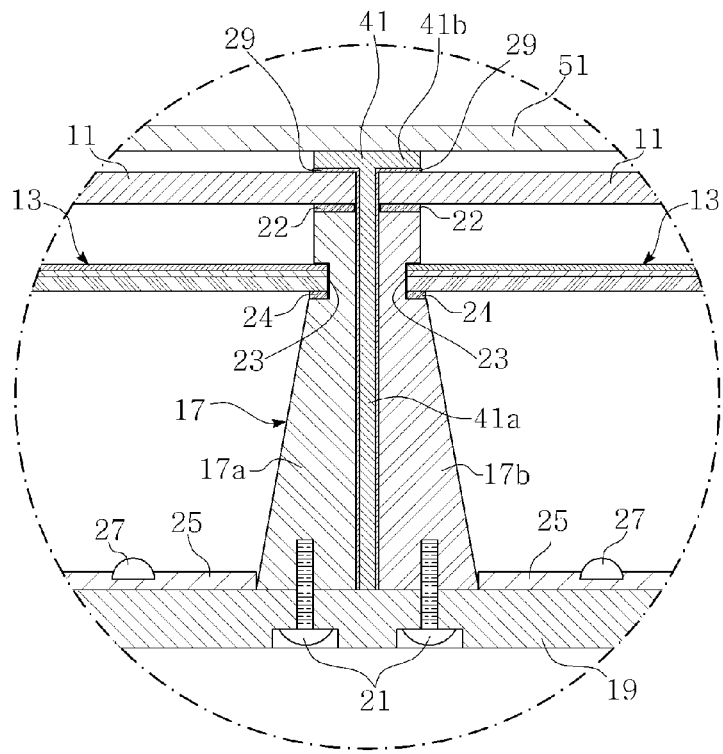
FIG. 4 is an enlarged view of a part A in FIG. 3.

Meanwhile, referring to FIG. 3 and FIG. 4, the fixing frame 17 includes portions 17a and 17b extending along neighboring edges of the plurality of the liquid crystal panels 11 in a state of being spaced from one another by a predetermined distance. The portions 17a and 17b of the fixing frame 17, as shown in the drawings, may be formed by separate members, but in another embodiment of the present, the fixing frame 17 may be formed in a single member to include the extended portions 17a and 17b.

Meanwhile, the liquid crystal display device according to an embodiment of the present invention includes a fixing bar 41 for fixing the liquid crystal panels 11 more strongly.

The fixing bar 41 is fitted between the spaced portions 17a and 17b in a state of pressing edges of the neighboring liquid crystal panels among the plurality of the liquid crystal panels 11.

In more detail, as shown in the drawings, the fixing bar 41a pillar 41a which is fitted between the adjacent portions 17a and 17b of the fixing frame 17, and a head 41b which is extended along a lateral direction at an upper end of the pillar 41a to press the edges of the neighboring liquid crystal panels 11. At this time, the lateral direction indicates a direction parallel with an upper surface of the liquid crystal panel 11. For example, the fixing bar 41 may be formed as a bar-shaped member having a T-shaped cross sectional view. The pillar 41a is fitted firmly between the spaced portions 17a and 17b of the fixing frame 17 so that the fixing bar 41 may be fixed to the fixing frame, and in this state the head 41b presses the edges of the upper surfaces of the liquid crystal panels 11 so that the liquid crystal panels 11 can be connected to the fixing frame 17 more strongly. That is, the fixing frame 17 is provided with the facing portions 17a and 17b being spaced from one another, and the pillar 41a of the fixing bar 41 is firmly fitted therebetween, so the fixing bar 41 can be connected to the fixing frame 17 more firmly through a simple structure and accordingly the liquid crystal panels 11 can be fixed more firmly.

The fixing bar 41 may be formed by any material which can provide strength to support the liquid crystal panels 11, and for example may be formed as plastic or metal such as aluminum.

In addition, as shown in FIG. 3 and FIG. 4, the liquid crystal panel 11 may be attached to an upper surface of the fixing frame 17 by an attaching member such as a double-sided adhesive tape 22.

Although the fixing frame 17 is illustrated in the drawing to be formed by a plurality of bar-shaped members, the fixing frame 17 may be formed in a single member which divides the upper surface of the mounting plate 19 into four areas.

Meanwhile, a double-sided adhesive tape 29 which covers the outer surface of the facing portions 17a and 17b of the fixing frame 17 may be provided. As shown in the drawing, the double-sided adhesive tape 29 may be formed to cover the outer portion of the facing portions 17a and 17b of the fixing frame 17 and edge portions of the liquid crystal panels 11. The liquid crystal panels 11 can be more firmly fixed by the double-sided adhesive tape 29.

An optical sheet 13 is disposed under the liquid crystal panel 11. For example, a groove 23 is formed on an inner surface of the fixing frame 17 which surrounds respectively the visible areas, and edges of the optical sheet 13 are fitted into the groove 23, so the optical sheet 13 can be connected to the fixing frame 17. For example, a double-sided adhesive tape 24 is attached to a bottom surface of the groove 23 of the fixing frame 17 and the optical sheet 13 is attached onto the same, so the optical sheet 13 can be firmly connected.

The optical sheet 13 may include one or plural optical sheets, and for example, may include a diffusion sheet, a prism sheet, a protection sheet, and the like. The optical sheet 13 is obvious to a person having ordinary skill in the art, so further explanation for the same will be omitted.

The backlight unit 15 may be realized any light source which can emitting light toward the liquid crystal panel 11, and for example may be disposed onto an upper surface of the mounting plate 19. In more detail, the backlight unit 15 may be realized by a pad 25 which is attached to the mounting plate 19 and a plurality of light emitting diodes 27 attached thereto. Light emitted from the backlight unit 15 passes the optical sheet 13 and the liquid crystal panel 11 sequentially.

Meanwhile, a frame 43 enclosing outer edges of the mounting plate 19 and the liquid crystal panels 11 may be provided. For ease of description, the frame 43 has been omitted in FIG. 2. By the frame 43, the liquid crystal panel 11 can be more firmly connected to the mounting plate 19. At this time, although the frame 43 is schematically shown in the drawing, the frame 43 may be formed in a structure of a conventional frame for use to fix a liquid crystal panel of a conventional liquid crystal display device.

Meanwhile, the liquid crystal display device according to an embodiment of the present invention may further include a tempered glass 51 which covers upper surfaces of the plurality of the liquid crystal panel s11 in a state of pressing an upper surface of the fixing bar 41. That is, as shown in the drawing, the tempered glass 51 is fixed in a way that the bottom surface thereof presses the upper surface of the head 41a of the fixing bar 41. Accordingly, the fixing bar 41 can be more firmly fixed to the fixing frame 17, and thereby the liquid crystal panel 11 can be more firmly fixed.

At this time, although a member for fixing the tempered glass 51 is not shown in the drawing, the tempered glass 51 can be fixed by a frame surrounding the tempered glass 51.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a mounting plate;
   a backlight unit which is mounted to the mounting plate;
   a plurality of liquid crystal panels which are arranged adjacent each other and spaced from an upper surface of the mounting plate;
   a fixing frame which is connected to the mounting plate and includes portions extending along neighboring edges of the plurality of the liquid crystal panels, the portions being spaced from one another by a predetermined distance;
   a fixing bar, which is fitted between adjacent portions of the portions of the fixing frame, pressing edges of neighboring liquid crystal panels among the plurality of the liquid crystal panels, the edges of the neighboring liquid crystal panels being uppermost surfaces of the neighboring liquid crystal panels, wherein the fixing bar includes
      a pillar which is fitted between the adjacent portions of the fixing frame, and
      a head extending along a lateral direction at an upper end of the pillar to press the edges of the neighboring liquid crystal panels, the head being directly above the neighboring liquid crystal panels along a straight line perpendicular to one of the uppermost surfaces of the neighboring liquid crystal panels;
   a tempered glass, which covers upper surfaces of the plurality of the liquid crystal panels, pressing an upper surface of the fixing bar and further pressing the head, the tempered glass pressing the head so as to press the neighboring liquid crystal panels via the head, the tempered glass touching an upper surface of the head; and
   an adhesive tape touching the head and the edges of the neighboring liquid crystal panels,
   the tempered glass pressing the neighboring liquid crystal panels via the head and the adhesive tape.

2. The liquid crystal display of claim 1, further comprising an optical sheet disposed under one of the liquid crystal panels, and wherein a groove to which the optical sheet is inserted is formed on an inside surface of the fixing frame.

3. A liquid crystal display comprising:
   a mounting plate;
   a plurality of liquid crystal display modules each including a liquid crystal panel, the liquid crystal panels being arranged to be adjacent each other and spaced from an upper surface of the mounting plate;
   a fixing frame which is connected to the mounting plate and includes portions extending along neighboring edges of the plurality of the liquid crystal panels, the portions being spaced from one another by a predetermined distance;
   a fixing bar, which is fitted between adjacent portions of the portions of the fixing frame, pressing edges of neighboring liquid crystal panels among the plurality of the liquid crystal panels, the edges of the neighboring liquid crystal panels being uppermost surfaces of the neighboring liquid crystal panels, wherein the fixing bar includes
      a pillar which is fitted between the adjacent portions of the fixing frame, and
      a head extending along a lateral direction at an upper end of the pillar to press the edges of the neighboring liquid crystal panels, the head being directly above the neighboring liquid crystal panels along a straight line perpendicular to one of the uppermost surfaces of the neighboring liquid crystal panels;
   a tempered glass, which covers upper surfaces of the plurality of the liquid crystal display modules, pressing an upper surface of the fixing bar and pressing the head, the tempered glass pressing the head so as to press the neighboring liquid crystal panels via the head, the tempered glass touching an upper surface of the head; and
   an adhesive tape touching the head and the edges of the neighboring liquid crystal panels,
   the tempered glass pressing the neighboring liquid crystal panels via the head and the adhesive tape.

4. The liquid crystal display of claim 3, wherein each liquid crystal display module comprises:
   an optical sheet disposed under the liquid crystal panel; and
   a backlight unit which is disposed below the optical sheet, and wherein a groove to which the optical sheet is inserted is formed on an inside surface of the fixing frame.

5. The liquid crystal display of claim 4, wherein for each liquid crystal display module, the backlight unit is disposed onto an upper surface of the mounting plate.

6. The liquid crystal display of claim 3, wherein the lateral direction is a direction parallel with an upper surface of the neighboring liquid crystal panels.

7. The liquid crystal display of claim 3, wherein the upper surface of the fixing bar is the upper surface of the head.

8. The liquid crystal display of claim 1, wherein the lateral direction is a direction parallel with an upper surface of the neighboring liquid crystal panels.

9. The liquid crystal display of claim 1, wherein the upper surface of the fixing bar is the upper surface of the head.

* * * * *